United States Patent
Jangili

(10) Patent No.: US 8,459,407 B2
(45) Date of Patent: Jun. 11, 2013

(54) SOUND ATTENUATION SYSTEMS AND METHODS

(75) Inventor: Ranjit Kumar Jangili, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 971 days.

(21) Appl. No.: 12/243,923

(22) Filed: Oct. 1, 2008

(65) Prior Publication Data

US 2010/0077754 A1    Apr. 1, 2010

(51) Int. Cl.
*E04F 17/04* (2006.01)

(52) U.S. Cl.
USPC .......................... 181/224; 181/213

(58) Field of Classification Search
USPC ............... 181/213, 214, 217, 218, 222, 224, 181/225, 252, 256, 292, 210, 290, 293
See application file for complete search history.

(56) References Cited

U.S. PATENT DOCUMENTS

| | | | | |
|---|---|---|---|---|
| 1,918,149 A | * | 7/1933 | Sullivan | 428/132 |
| 2,489,048 A | * | 11/1949 | Rinehart | 181/224 |
| 3,019,850 A | * | 2/1962 | March | 181/224 |
| 3,522,863 A | * | 8/1970 | Ignoffo | 181/252 |
| 4,184,565 A | * | 1/1980 | Price et al. | 181/252 |
| 4,316,522 A | * | 2/1982 | Hirschorn | 181/224 |
| 4,336,863 A | * | 6/1982 | Satomi | 181/224 |
| 4,487,290 A | * | 12/1984 | Flaherty | 181/256 |
| 4,645,032 A | * | 2/1987 | Ross et al. | 181/250 |
| 4,842,096 A | * | 6/1989 | Fujitsubo | 181/252 |
| 5,869,792 A | * | 2/1999 | Allen et al. | 181/224 |
| 6,116,377 A | * | 9/2000 | Dugan | 181/272 |
| 2002/0153197 A1 | * | 10/2002 | Cummings et al. | 181/249 |
| 2005/0161280 A1 | * | 7/2005 | Furuya | 181/225 |

* cited by examiner

*Primary Examiner* — Jeremy Luks
(74) *Attorney, Agent, or Firm* — Fletcher Yoder, P.C.

(57) ABSTRACT

Methods and devices for increasing the sound attenuation properties of a noise suppression device are provided. Various embodiments include sound-attenuating cavities with improved sound capturing openings. In some embodiments, the sound capturing openings include holes surrounded by projections. In other embodiments, the sound capturing openings include angled slats. Embodiments also include sound capturing devices that include the improved sound capturing openings, such as silencers, vent hoods, barrier walls, air exchanges, and air intake and exhaust ducts.

19 Claims, 8 Drawing Sheets

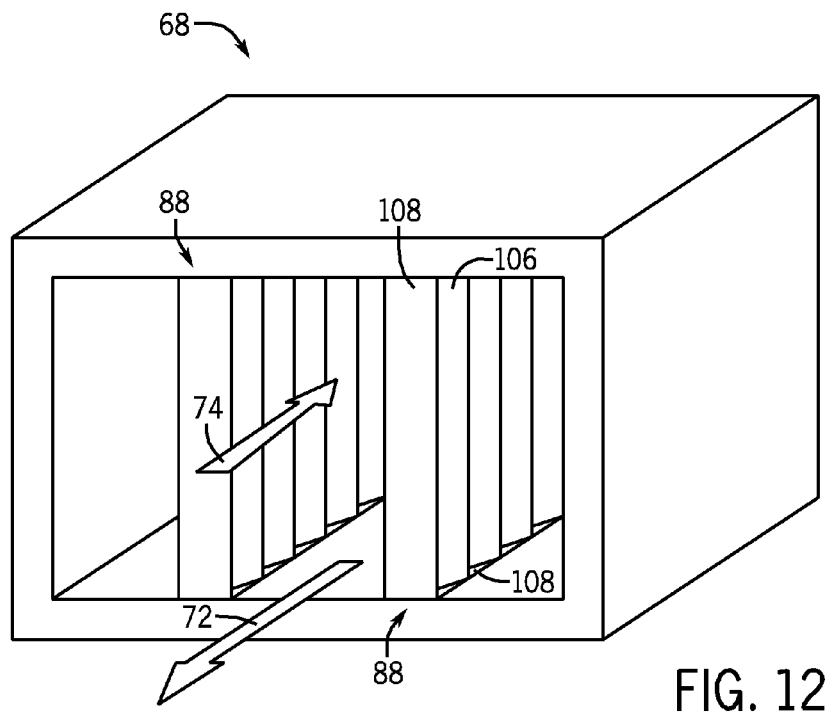
FIG. 12
FIG. 13
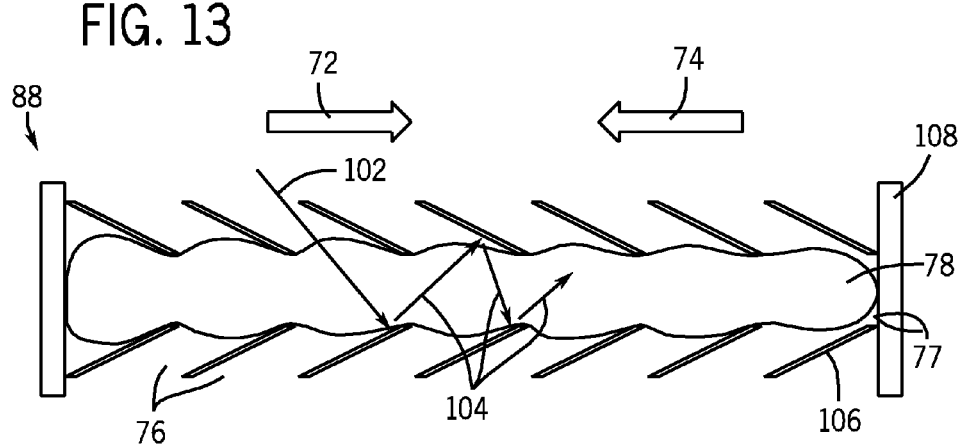

SOUND ATTENUATION SYSTEMS AND METHODS

BACKGROUND

The invention relates generally to noise suppression techniques, and more particularly to systems and methods that provide improved sound attenuation properties.

The environmental noise caused by airplanes, automobiles, and other modern machinery can often be an annoyance. To maintain noise below acceptable levels, noise suppression techniques are often employed. Noise suppression has, therefore, become an important technology with a wide variety of industrial and residential applications. Noise suppression devices are often applied in heating ventilation and air conditioning (HVAC) systems, industrial machinery and complexes, transportation vehicles, and any machinery that may tend to produce unacceptably high levels of noise.

Accordingly, various devices and techniques exist for the suppression of noise. For example, to reduce the noise produced by heating and air conditioning systems, noise suppression devices are often fitted within ventilation ducts, ventilation intakes and exhausts, air extracts, etc. In the industrial setting, noise suppression technology is often applied to exhaust ducts, exhaust stacks, and air intake ducts to machinery such as compressors. To further reduce environmental noise, loud machinery is often contained within acoustic enclosures fitted with sound dampening barrier walls. To provide air circulation for acoustic enclosures while still reducing noise, vents are often equipped with acoustic hoods, louvers, silencers or some combination thereof.

The level of sound reduction, or attenuation, provided by such devices is often described in terms of the device's insertion loss. Insertion loss is the reduction in sound amplitude which results from inserting a sound-attenuating device in a sound conducting channel, and is often measured in decibels. In a test configuration wherein the sound amplitude is measured at the output of a sound conducting channel, insertion loss may be defined as a ratio of the sound amplitude without the sound-attenuating device inserted (A1) to the sound amplitude with the sound-attenuating device inserted (A2). This ratio may then be represented according to the following equation:

$$\text{Insertion loss (db)} = 20 \log(A1/A2)$$

Typically, the insertion loss of such devices increases as the length of the device increases. Furthermore, to maintain acceptable air flow, the overall cross-sectional area of the device may be enlarged to compensate for the air flow resistance caused by the sound attenuation elements. Therefore, noise suppression equipment may tend to be bulky and expensive. As a result, it may be beneficial to provide a device with improved sound attenuation.

BRIEF DESCRIPTION

Embodiments of the present disclosure provide for methods and devices that increase the sound attenuation properties of certain noise suppression devices. More specifically, sound-attenuating cavities are provided which include improved sound capturing openings that tend to retain sound within the cavity rather than allow the sound to exit back through the openings. In some embodiments, the sound capturing openings include holes surrounded by projections. In other embodiments, the sound capturing openings include angled slats. Embodiments also provide noise suppression devices that include the improved sound-attenuating cavities. Still other embodiments provide noise producing machinery that includes the improved sound-attenuating cavities.

DRAWINGS

These and other features, aspects, and advantages of the present invention will become better understood when the following detailed description is read with reference to the accompanying drawings in which like characters represent like parts throughout the drawings, wherein.

Figure 3:
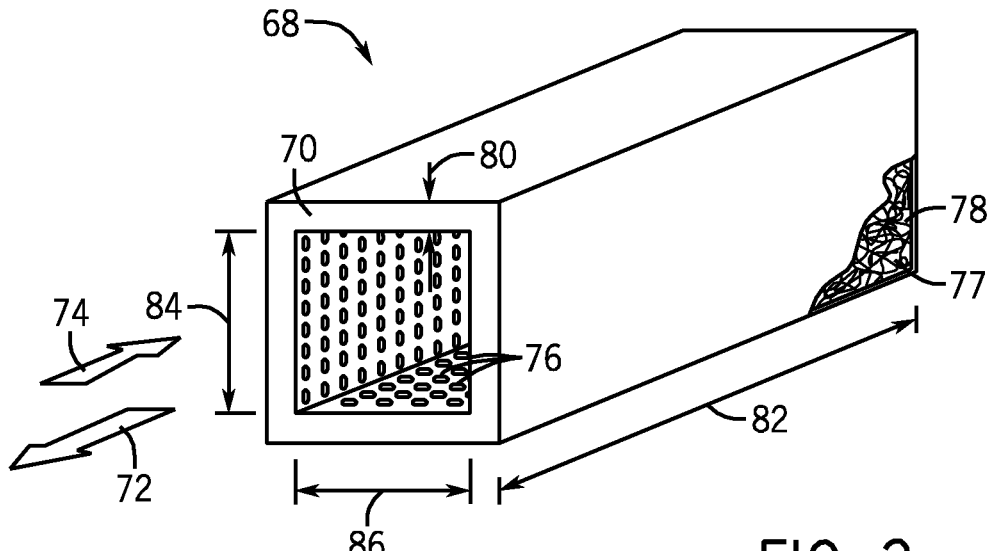
FIGS. 3 and 4 are perspective views showing exemplary sound-attenuating conduits that may be applied to the various noise sources depicted in FIGS. 1 and 2 in accordance with certain embodiments.
Figure 4:
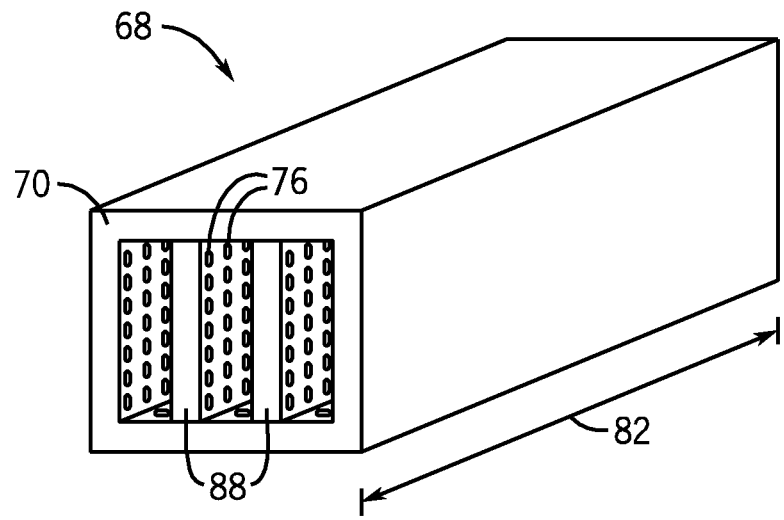
Figure 5:
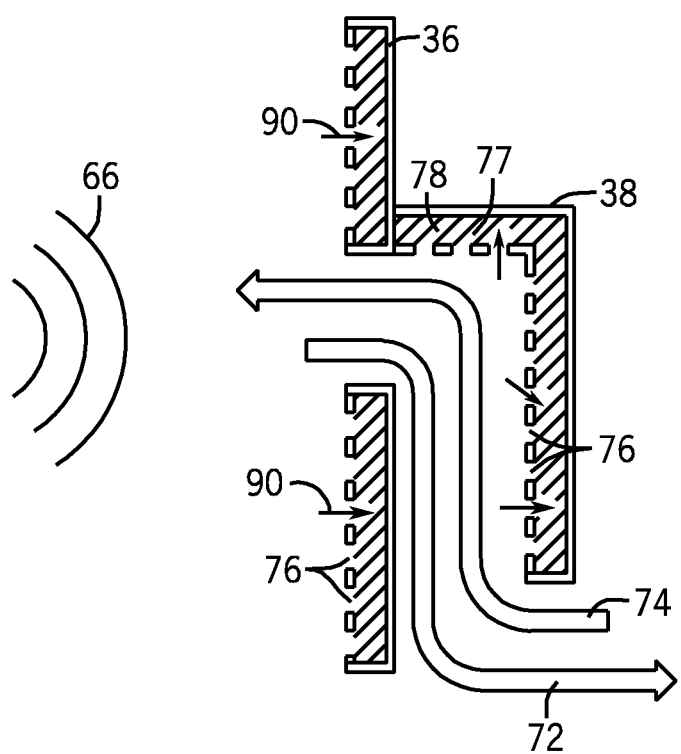
FIG. 5 is a cross-sectional view that illustrates an exemplary sound-attenuating barrier wall and vent hood in accordance with certain embodiments.
Figure 7A:
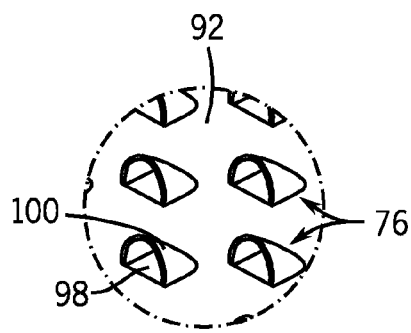
Figure 7C:
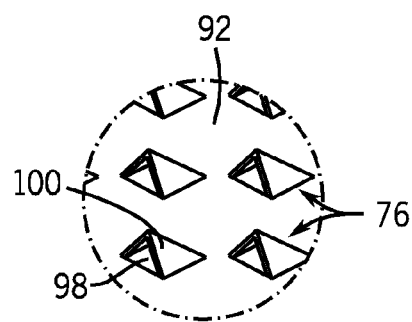
Figure 7B:
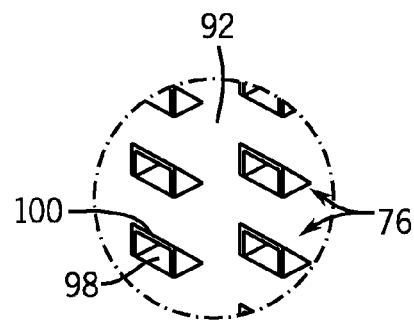
Figure 8:
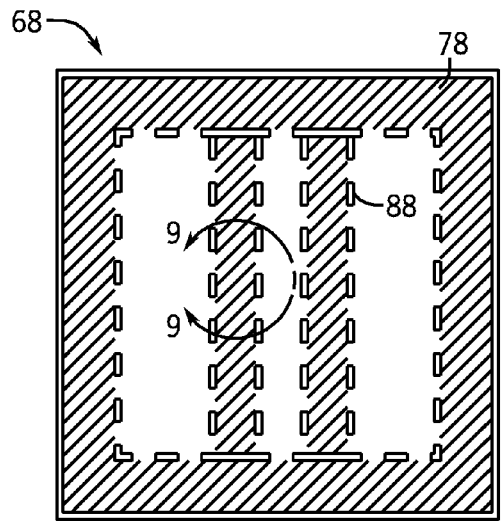

FIGS. 7A, 7B, and 7C are close-up views of an inside wall of an exemplary sound-absorbing conduit illustrating the sound-capturing openings shown in FIGS. 3, 4, and 5 in accordance with certain embodiments;

FIG. 8 is a cross-sectional view of an exemplary sound-attenuating conduit with baffles in accordance with certain embodiments.

Figure 9A:
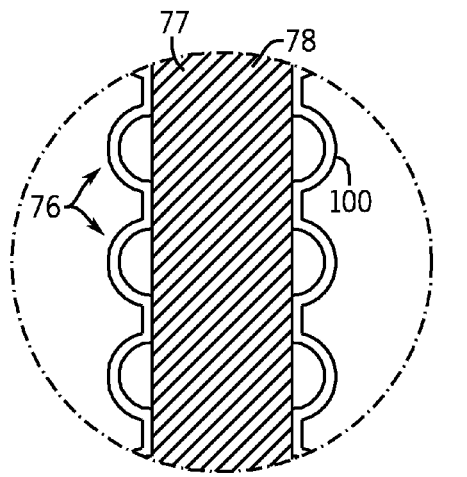
Figure 9B:
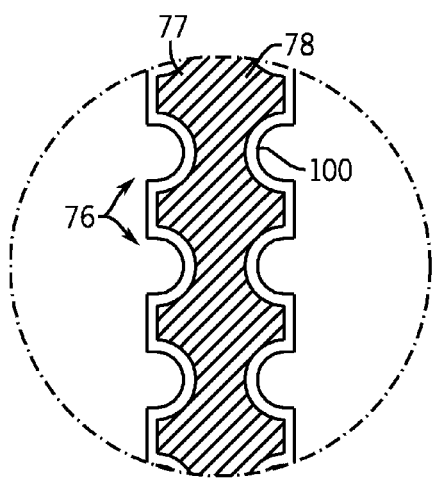
Figure 10:
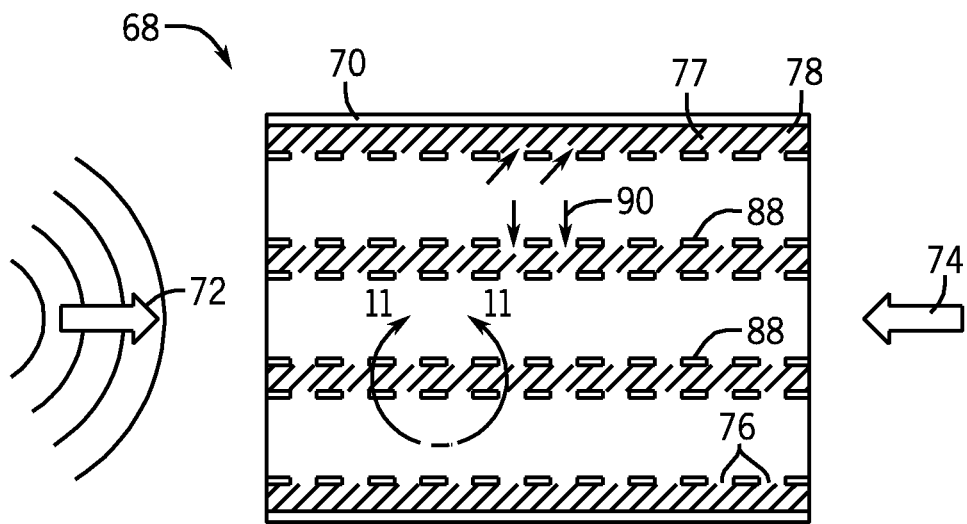
Figure 11:
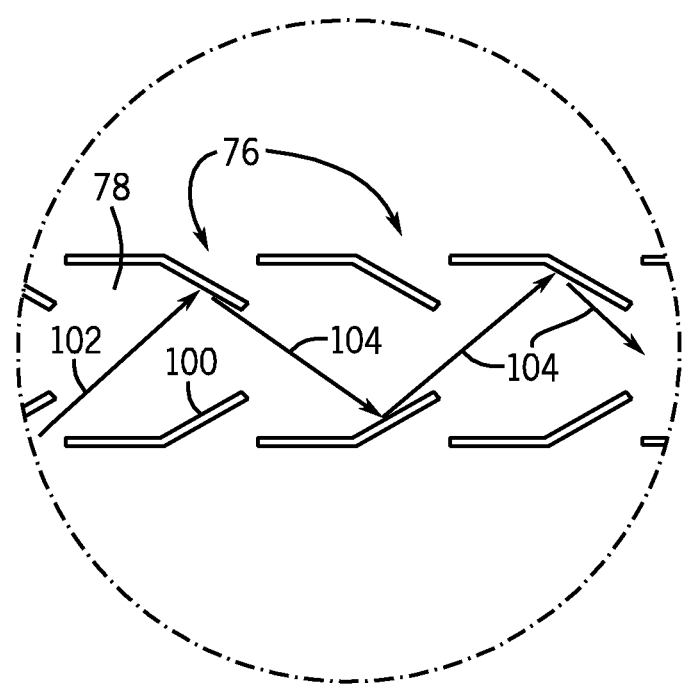

FIGS. 9A and 9B are cross-sectional views of an exemplary sound-attenuating baffle, illustrating the sound-capturing openings shown in FIGS. 3, 4, and 5 in accordance with certain embodiments;

FIG. 10 is a cross-sectional top view of an exemplary sound-attenuating conduit with baffles in accordance with certain embodiments;

FIG. 11 is a close-up view of an exemplary sound-attenuating baffle illustrating the sound attenuation properties of the sound-capturing openings shown in FIGS. 3, 4, and 5;

FIG. 12 is a perspective view of an exemplary sound-attenuating conduit that includes baffles with sound-capturing slats in accordance with certain embodiments; and FIG. 13 is a cross-sectional view of an exemplary sound-attenuating baffle illustrating the sound attenuation properties of the sound-capturing slats shown in FIG. 10.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Aspects of the present invention relate to improved noise suppression techniques. Specifically, noise suppression devices in accordance with certain embodiments include sound attenuating cavities with improved openings that provide better sound-capturing and sound retention characteristics compared to prior art. The improved openings increase the insertion loss of noise suppression devices made in accordance with the techniques described herein. As a result, noise suppression devices may be made smaller, lighter, and less expensive compared to prior art devices that provide the same level of sound attenuation.

Figure 1:
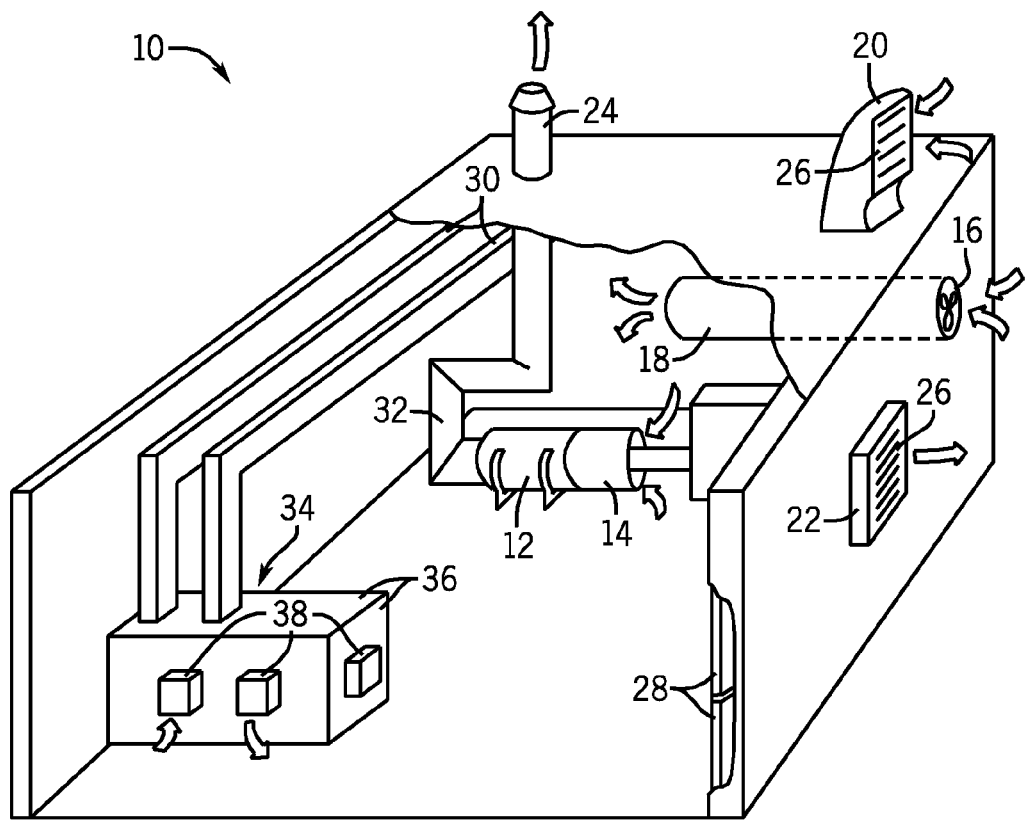
FIG. 1 is an environmental view of an exemplary building showing various noise sources to which sound attenuation equipment may be fitted in accordance with certain embodiments.

Turning now to the figures, FIG. 1 depicts an exemplary building 10 with various sources of noise and various air intake and exhaust points where noise can escape to the outside environment. The building 10 may be an industrial complex or residential building. The building 10 includes one or more noise sources such as the machinery 12, which may include heating systems, air conditioning systems, motors, turbines, compressors, pumps, machine tools, etc. The noise created by these sources may cause annoyance to people inside or around the building 10.

The machinery 12 may include an air in-take 14, which may provide air to a gas compressor of the machinery 12, for example. The building 10 may also include a ventilation system. Accordingly, the building 10 may include ventilation intakes 16 that draw air from the outside and distribute the air through the building 10 through air ducts 18. The building 10 may also include an air extract 20 for providing outside air to machinery within the building 10 such an air conditioning unit, for example. The building 10 may also include a ventilation exhaust 22. In addition, the machinery 12 may produce exhaust fumes that may exit through the exhaust stack 24.

It will be appreciated that the air intake and exhaust points may provide an opportunity for noise produced within the building 10 to escape to the outside environment. To comply with government enacted safety and environmental standards and otherwise reduce noise, various sound attenuation devices in accordance with the disclosed embodiments may be acoustically coupled to the noise sources throughout the building 10. For example, the air extract 20 and the ventilation exhaust 22 may include sound blocking louvers 26. The exterior walls of the building 10 may also be fitted with noise blocking panels 28. Additionally, the air ducts 30 and exhaust duct 32 may be fitted with silencers that absorb sound produced by the machinery 12. Furthermore, loud machinery may be housed with an enclosure 34, which may include barrier walls 36 and may be fitted within noise blocking ventilation hoods 38.

Figure 2:
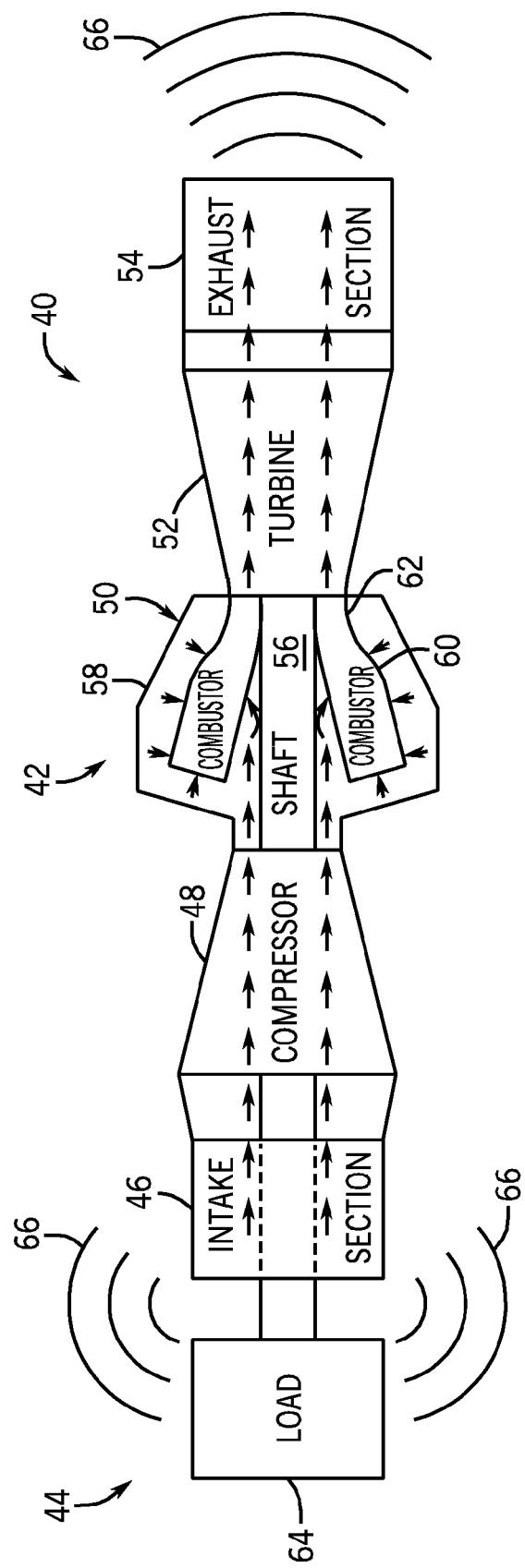
FIG. 2 is a block diagram of an exemplary system having a gas turbine engine to which sound attenuation equipment may be fitted in accordance with certain embodiments.

FIG. 2 is a block diagram of an exemplary system 40 that includes a gas turbine engine 42 acoustically coupled to sound attenuation equipment in accordance with embodiments of the present technique. For example, the system 40 may include an aircraft, a watercraft, a locomotive, a power generation system, or combinations thereof. Accordingly, the load 44 may include a generator, a propeller, a transmission, a drive system, or combinations thereof. The illustrated gas turbine engine 42 includes an air intake section 46, a compressor 48, a combustor section 50, a turbine 52, and an exhaust section 54. The turbine 52 is drivingly coupled to the compressor 48 via a shaft 56.

As indicated by the arrows, air flows through the intake section 46 and into the compressor 48, which compresses the air prior to entry into the combustor section 50. The illustrated combustor section 50 includes a combustor housing 58 disposed concentrically or annularly about the shaft 56 between the compressor 48 and the turbine 52. Inside the combustor housing 58, the combustor section 50 includes a plurality of combustors 60 disposed at multiple radial positions in a circular or annular configuration about the shaft 56. The compressed air from the compressor 48 enters each of the combustors 60, and then mixes and combusts with fuel within the respective combustors 60 to drive the turbine 52. Some or all of the resulting power may be used to drive the shaft 56 into rotation for powering the compressor 48 and/or the load 64. In some embodiments, the exhaust air is used as a source of thrust for a vehicle such as a jet plane.

As depicted in FIG. 2, the system 40 includes two main areas for noise to escape. Specifically, noise originating in the combustor section 50, compressor section 48, turbine section 52, or a combination thereof may tend to escape from the system 40 at the intake section 46 and the exhaust section 54, as illustrated by the sound waves 66. To reduce the noise released by the system 40 to acceptable levels, the system 40 may include sound-attenuating devices in accordance with present embodiments, such as silencers, in or along the flow path to/from the intake section 46 and the exhaust section 54. The sound-attenuating devices, which will be described further below, allow the air to pass while reducing the amplitude of the sound.

FIG. 3 depicts an exemplary sound-attenuating conduit 68 that may be employed in the various sound-attenuating devices described above in accordance with embodiments. The conduit 68 may include side walls 70 that direct a flow of air and attenuate sound waves traveling through the conduit 68. The direction of the air flowing through the conduit 68 is indicated by arrow 74 while the direction of sound emanating from the conduit 68 is indicated by the arrow 72. As indicated by the direction of air and the sound, it will be appreciated that the conduit 68 as depicted in FIG. 3 is an intake conduit. In some embodiments, however, the conduit 68 or an array of conduits 68 may also act as an exhaust, in which case the sound and the air may travel in the same direction. The conduit 68 may be acoustically coupled to a noise producing device such as the turbine 52 or the compressor 48 as shown in FIG. 2. The conduit 68 may also be acoustically coupled to the machinery 12 or within air ducts 18 and 30, as shown in FIG. 1. Although, for convenience, the present disclosure refers to air conduits, it will be appreciated that the disclosed embodiments may also include conduits that conduct any gas or fluid through which sound may travel.

To absorb sound, the side walls 70 of the conduit 68 may be hollow enclosures that form sound-attenuating cavities 77. It should be noted that the term "hollow," as used in the present application, is intended to describe the form of the side walls 70 and does not refer to whether the side walls 70 are filled with sound attenuating material. Along the internal surfaces of conduit 68 there may be several openings 76 that enable sound to enter the sound-attenuating cavities 77. As will be described further below, the openings 76 are specially shaped to enable sound to enter the sound-attenuating cavities 77 and substantially retain the sound within the sound-attenuating cavities 77. To increase the level of sound attenuation, the cavities 77 may be filled with sound-attenuating material 78, such as mineral wool, fiberglass, foam, or any other material suitable for attenuating sound. In some embodiments, the sound-attenuating cavities 77 may be left empty. As the sound travels through the conduit 68, sound enters the openings 76 and is attenuated by the sound-attenuating material 78, thereby reducing the amplitude of the sound exiting the conduit 68.

The dimensions of the conduit 68 may be controlled to balance the sound attenuation and air flow properties of the conduit 68. For example, the noise attenuation of the conduit 68 may be increased by increasing the wall thickness 80, which may increase the size of the sound-attenuating cavity and the amount of sound-attenuating material 78 included in the side wall 70. Additionally, the length 82 may be increased to improve the sound attenuation properties of the conduit 68. However, increasing the wall thickness 80 and/or the length 82 may increase the airflow resistance of the conduit 68. Therefore, to maintain proper air flow, the height 84 and/or width 86 of the conduit 68 may be varied. Increasing the size of the conduit increases weight, space consumption and cost of the device. Additionally, many applications have a limited amount of space available for noise suppression devices. For these reasons it is desirable to improve the sound attenuation of the conduit in a smaller space.

Nevertheless, because the openings 76 provide for increased sound attenuation, the desired level of sound attenuation may be obtained with a smaller conduit 68, i.e. a conduit 68 with reduced height 84, width 86, length 82, or wall thickness 80, as compared to prior art devices. Reducing the size of the conduit 68 may provide increased airflow through the conduit 68, while also providing the cost savings, space savings, and weight reduction of a smaller device.

FIG. 4 depicts another embodiment of a sound-attenuating conduit 68. As shown in FIG. 4, the conduit 68 includes baffles 88 that increase the level of sound attenuation provided by the conduit 68. Like the side walls 70, the baffles 88 may be enclosures that form sound-attenuating cavities filled with sound-attenuating material 78. However, unlike the side walls 70, both sides of the baffles 88 may include openings 76. By including the baffles 88, the amount of sound-attenuating surface area and volume within the conduit 68 may be increased, thus shortening the length 82 of the conduit 68 that will provide a desired level of sound attenuation. Thus, for a set amount of space, the illustrated embodiment provides better noise attenuation. However, placing baffles 88 within the conduit 68 may also tend to increase airflow resistance through the conduit 68, which may be compensated for by increasing the cross-sectional area of the conduit 68.

FIG. 5 is a diagram of an exemplary embodiment of a barrier wall 36 with a vent hood 38. Both the barrier wall 36 and the vent hood 38 include enclosures that form sound-attenuating cavities 77 filled with sound-attenuating material 78 and include openings 76 through which sound waves may enter the sound-attenuating cavity 77, as illustrated by the arrows 90. In the embodiment shown, sound waves 66 pass through the vent hood 38, as illustrated by the arrow 72, while air passes through the vent hood 38, as illustrated by arrow 74. The vent hood 38 depicted may be placed over any vent or opening from which sound may tend to escape into an outside environment, and provides a sound barrier which may tend to attenuate a portion of the sound passing through the vent hood 38.

Figure 6:
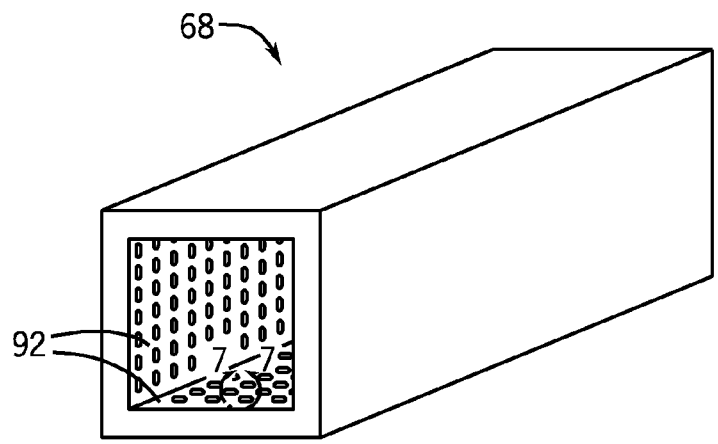
FIG. 6 is a perspective view of an exemplary sound-attenuating conduit in accordance with certain embodiments.

FIG. 6 illustrates a conduit 68 with openings 76 on the internal surfaces of the conduit 68 in accordance with certain embodiments described above. Line 7-7 shows the location of a close-up view illustrated in FIGS. 7A, 7B, and 7C. FIGS. 7A, 7B, and 7C illustrate three alternate close-up views of the internal wall of the conduit 68 shown in FIG. 6 and provides more detail regarding the shape of the openings 76 that lead into the sound-attenuating cavity 77. As shown in FIG. 7A, the openings 76 may include a hole 98 through which sound may enter into the sound-attenuating cavity 77 and a projection 100 that surrounds the hole 98 and projects into or out of the sound-attenuating cavity 77. To acoustically bias the opening 76 toward the direction of the oncoming sound waves, the projection 100 may be angled over the hole such that the opening 76 faces toward the noise source. Additionally, the projection may partially or completely cover the hole as viewed from a direction perpendicular to the panel. As will be explained further below, the shape of the projection 100 serves to capture and retain sound within the sound-attenuating cavity, preventing sound from being reflected back out through the hole 98.

As shown in FIGS. 7A, 7B and 7C, the openings 76 form a pattern of non-flat perforations formed in the sheet 92. Furthermore, the openings 76 may include holes 98 and the perforations 100 that may be any of a variety of sound capturing and retaining shapes. For example, as shown in FIG. 7A, the hole 98 may form a triangular shape and the projection 100 may form a semi-circle as viewed in a direction parallel to the sheet 92. The projections 100 may also be tapered, forming a semi-conical covering over the hole that is open at the base of the cone. The base of the conical projection 100 may face in the direction of oncoming sound waves to better attenuate sound traveling through the conduit 68. As seen in FIG. 7B, the hole 98 may form a rectangle and the projections 100 may form a rectangle as viewed in a direction parallel to the panel. In this example, the tapering of the rectangular projections 100 may form a triangular prism that is open at the side facing the direction of oncoming sound waves and the side facing the hole. As seen in FIG. 7C, the hole 98 may form a triangular shape and the projections 100 may form a triangle as viewed in a direction parallel to the panel. In this example, the tapering of the triangular projections 100 may form a pyramidal shaped covering that is open at the side of the pyramid that faces in the direction of oncoming sound waves and the side facing the hole. It will be appreciated that the examples provided in FIGS. 7A, 7B, and 7C are not limiting and that the present disclosure is not limited to a particular shape of hole 98 or projection 100.

The openings 76 described above may be formed by simultaneously deforming and perforating a sheet 92 with a stamp, which simultaneously forms the hole 98 and the projection 100. Furthermore, the sheet 92 may be processed to add several openings 76 simultaneously. Alternatively, the hole 98 and the projection 100 may be formed separately. For example, the hole 98 may be formed in the sheet 92 first, and the projection 100 may be attached to the sheet 92 after formation of the hole. The sheet 92 may be made of any rigid or semi-rigid material, such as metal, plastic, wood, paperboard, or fiberboard, for example.

Turning to FIGS. 8, 9A, and 9B, additional embodiments of the openings 76 are shown. FIG. 8 shows a cross-section of a conduit 68 with baffles 88. As can be seen in FIG. 8, the side walls 70 of the conduit 68 define sound-attenuating cavities 77 that may be filled with a sound-attenuating material 78. Furthermore, the openings 76 may be disposed on the internal surfaces of the conduit 68, as shown. Line 9-9 shows the location of the close-up views provided in FIGS. 9A and 9B.

Turning specifically to the close-up view of FIG. 9A, openings 76 are shown wherein the projections 100 extend outward, away from the sound-attenuating cavity 77 and into the air flow path. Extending the projections 100 into the air flow path may increase the air resistance of the conduit 68, but may also increase the sound capturing qualities of the openings 76. Turning specifically to the close-up view of FIG. 9B, openings 76 are shown wherein the projections 100 extend inward, toward the inside of the sound-attenuating cavity 77. Extending the projections 100 into the cavity 77 and out of the air flow path may tend to reduce air turbulence and air-flow generated noise within the conduit 68 and may decrease the air flow resistance of the conduit 68. In either embodiment, the openings 76 may be angled in a manner that improves sound capturing, and reduces sound escape from the cavity 77.

FIG. 10 is a cross-sectional top view of the sound-attenuating conduit 68 of FIG. 4. As described above, the conduit 68 includes the side walls 70 and baffles 88. In the embodiment depicted, sound is traveling through the conduit 68 in the direction indicated by arrow 72, while air is travelling through the conduit 68 in the direction indicated by the arrow 74. As the sound travels through the conduit 68, a portion of the sound enters through the openings 76 as indicated by arrows 90. Line 11-11 shows the location of a close-up view shown in FIG. 11 that illustrates the sound capturing properties of the baffle 88 in accordance with the embodiments.

Referring to the close-up view of FIG. 11, it can be seen how the openings 76 allow the baffle 88 to retain the sound waves that enter the baffle 88. First, sound enters through the openings 76 as indicated by the arrow 102. The sound wave is then attenuated by the sound-attenuating material 78 within the sound-attenuating cavity 77. The amplitude of the sound wave decreases as it moves through the sound-attenuating material 78. The longer that the sound wave travels through the sound-attenuating material 78, the more the sound wave is attenuated. As shown in FIG. 11, the projections 100 prevent the existence of an unobstructed, straight-line path that leads from one opening 76 to another opening 76 on the opposite side of the baffle 88. Therefore, as the sound wave approaches the opposite side of the baffle 88, the sound wave is reflected from the projections 100 rather than exiting the sound-attenuating cavity 77. Furthermore, the sound waves may be repeatedly reflected throughout the sound-attenuating cavity 77 resulting in an increased attenuation of the sound wave. It will be appreciated that without the projections 100, the sound wave would have a less obstructed path by which to exit the sound-attenuating cavity 77. In the disclosed embodiment, inward projections, outward projections, or both may be used to improve the sound capturing ability of the walls and baffles, thereby forcing the sound to pass through material 78 for improved attenuation.

Referring now to FIGS. 12 and 13, another embodiment of a conduit 68 that includes a sound-attenuating baffle 88 is depicted. As with previous embodiments, the embodiment shown in FIGS. 10 and 11 may include a conduit 68 with baffles 88 that increase the level of sound attenuation provided by the conduit 68. Furthermore, the baffles 88 may be filled with sound-attenuating material 78, and both sides of the baffles 88 may include openings 76. However, in the present embodiment, the sides of the baffles 88 may include angled slats 106 held in place by a frame 108.

As shown in FIG. 13, the slats 106 may be located on both sides of baffle 88 and may form the sound-attenuating cavity 77. Furthermore, the slats 106 may be slanted toward the noise source, i.e. angled inward to provide an opening whereby sound waves 72 can easily enter the sound-attenuating cavity 77, as indicated by the arrow 102. Additionally, the angle and positioning of the slats 106 also prevent the sound waves from easily exiting the sound-attenuating cavity 77. Accordingly, the slats 106 may repeatedly reflect the sound waves internally through the sound-attenuating material 78 as indicated by the arrows 104, increasing the sound attenuation of the baffle 88.

According to the techniques described above, the sound attenuation properties of a noise suppression device may be increased compared to prior art devices. Embodiments of the present techniques may include a wide range of noise inhibiting devices such as silencers, noise suppressing hoods, noise suppressing barrier walls, etc. Such sound-attenuating devices may be included in duct work, in air exchanges, exhaust ducts, air intake ducts, or any other application where noise may escape to an outside environment. Embodiments of the present techniques may also include certain machinery with sound suppression devices included in the air intake or exhaust sections of the machinery, such as gas turbine engines, or jet engines. Other applications of the sound-attenuating devices described above or occur to those of ordinary skill in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a sound-attenuating device, comprising:
   a hollow wall having a sound-attenuating cavity;
   a sound-attenuating material disposed in the sound-attenuating cavity of the hollow wall; and
   a plurality of openings into the hollow wall, wherein the openings are disposed adjacent projections that enable entry of sound waves into the hollow wall and substantially block departure of the sound waves away from the hollow wall, and the projections comprise inwardly tapered projections that extend inwardly from the hollow wall into the sound-attenuating cavity, wherein the inwardly tapered projections completely overlap the openings to block a straight path through the openings, wherein the hollow wall comprises first and second perforated walls that oppose one another about the sound-attenuating material disposed in the sound-attenuating cavity, the first perforated wall comprises a first plurality of openings with a first plurality of inwardly tapered projections that extend inwardly from the first perforated wall into the sound-attenuating cavity, and the second perforated wall comprises a second plurality of openings with a second plurality of inwardly tapered projections that extend inwardly from the second perforated wall into the sound-attenuating cavity, wherein the first plurality of inwardly tapered projections each comprise a first section angled inwardly with respect to a second section about a first vertex, the second plurality of inwardly tapered projections each comprise a third section angled inwardly with respect to a fourth section about a second vertex disposed across the first vertex to direct the sound waves into the sound-attenuating material and bounce the sound waves back and forth between the first and second perforated walls.

2. The system of claim 1, comprising a conduit having the hollow wall, wherein the plurality of openings are disposed along an interior of the conduit.

3. The system of claim 1, wherein the hollow wall comprises a first unperforated wall and a second perforated wall that oppose one another about the sound-attenuating material disposed in the sound-attenuating cavity.

4. The system of claim 1, wherein the projections comprise a plurality of angled slats in a series along at least one side of the hollow wall, and the openings are disposed between the angled slats.

5. A system, comprising:
   a sound-attenuating device, comprising:
   a fluid flow path;
   a first perforated wall having first and second sides that are opposite to one another, wherein the first side faces the fluid flow path, and the second side faces away from the fluid flow path;
   a sound capturing region adjacent the second side of the first perforated wall, wherein the first perforated wall comprises a first plurality of openings adjacent a first plurality of inwardly tapered projections that extend inwardly from the first perforated wall into the sound capturing region, wherein the first plurality of inwardly tapered projections completely overlap the first plurality of openings to block a straight path through the first plurality of openings; and a second perforated wall disposed opposite from the first perforated wall about the sound capturing region, wherein the second perforated wall has third and fourth sides that are opposite to one another, the third side faces the fluid flow path, the fourth side faces away from the fluid flow path into the sound capturing region, and the second perforated wall comprises a second plurality of openings adjacent a second plurality of inwardly tapered projections that extend inwardly from the second perforated wall into the sound capturing region and wherein the first plurality of inwardly tapered projections each comprise a first section angled inwardly with respect to a second section about a first vertex, the second plurality of inwardly tapered projections each comprise a third section angled inwardly with respect to a fourth section about a second vertex disposed across the first vertex to direct the sound waves into a sound-attenuating material and bounce the sound waves back and forth between the first and second perforated walls.

6. The system of claim 5, comprising a sound-attenuating material disposed in the sound capturing region.

7. The system of claim 5, comprising the sound-attenuating material disposed in the sound capturing region.

8. The system of claim 5, wherein the first plurality of inwardly tapered projections are slanted toward a noise source.

9. A system, comprising:
a sound-attenuating device, comprising:
   a sound-attenuating material;
   a first perforated wall disposed along a first side of the sound-attenuating material, wherein the first perforated wall comprises a first plurality of openings with a first plurality of tapered projections that are slanted relative to the first perforated wall into the sound-attenuating material; and
   a second perforated wall disposed along a second side of the sound-attenuating material opposite from the first perforated wall, wherein the second perforated wall comprises a second plurality of openings with a second plurality of tapered projections that are slanted relative to the second perforated wall into the sound-attenuating material, and the first and second plurality of tapered projections are to direct sound waves into the sound-attenuating material and bounce the sound waves back and forth between the first and second perforated walls, wherein the first and second plurality of tapered projections completely block a straight line path of the sound waves in a perpendicular direction through the first and second perforated walls and wherein the first plurality of inwardly tapered projections each comprise a first section angled inwardly with respect to a second section about a first vertex, the second plurality of inwardly tapered projections each comprise a third section angled inwardly with respect to a fourth section about a second vertex disposed across the first vertex to direct the sound waves into the sound-attenuating material and bounce the sound waves back and forth between the first and second perforated walls.

10. The system of claim 9, wherein at least one of the first or second plurality of tapered projections comprises inwardly tapered projections that extend inwardly from the first or second perforated wall into a sound capturing region having the sound-attenuating material.

11. The system of claim 9, wherein the sound-attenuating device comprises a baffle within a conduit between first and second portions of a fluid flow path, and the baffle comprises the first and second perforated walls on opposite sides of the baffle.

12. The system of claim 9, comprising a vent hood having the sound-attenuating device.

13. A method of attenuating sound waves, comprising:
receiving sound waves from a noise source through one or more openings in a hollow wall that defines a sound-attenuating cavity having a sound-attenuating material; and
blocking the sound waves from exiting through the one or more openings with one or more inwardly tapered portions that surround the one or more openings, wherein the one or more inwardly tapered portions project inwardly from the hollow wall into the sound-attenuating cavity and the one or more inwardly tapered portions completely overlap the one or more openings to block a straight path through the openings and wherein the first plurality of inwardly tapered projections each comprise a first section angled inwardly with respect to a second section about a first vertex, and a second plurality of inwardly tapered projections each comprise a third section angled inwardly with respect to a fourth section about a second vertex disposed across the first vertex to direct the sound waves into the sound-attenuating material and bounce the sound waves back and forth between the first and second perforated walls.

14. The method of claim 13, wherein the inwardly tapered portions are slanted toward the noise source.

15. The method of claim 13, wherein blocking the sound waves from exiting through the one or more openings comprises reflecting the sound waves from the one or more inwardly tapered portions.

16. The system of claim 1, comprising a noise source, wherein the sound-attenuating device is configured to receive the sound waves upstream or downstream of the noise source.

17. The system of claim 16, wherein the noise source comprises a turbine, a machine, a heating system, an air conditioning system, a motor or engine, a compressor, a pump, a tool, or any combination thereof.

18. The system of claim 1, comprising an air intake section or an exhaust section having the sound-attenuating device.

19. The system of claim 1, wherein the sound-attenuating device comprises a sound dampening panel.

\* \* \* \* \*